(12) United States Patent
Nevin

(10) Patent No.: US 11,292,162 B2
(45) Date of Patent: Apr. 5, 2022

(54) METHOD OF FABRICATING LATEX PRODUCTS

(71) Applicant: Don Nevin, Syosset, NY (US)

(72) Inventor: Don Nevin, Syosset, NY (US)

( * ) Notice: Subject to any disclaimer, the term of this patent is extended or adjusted under 35 U.S.C. 154(b) by 0 days.

(21) Appl. No.: 17/163,782

(22) Filed: Feb. 1, 2021

(65) Prior Publication Data

US 2021/0213653 A1 Jul. 15, 2021

Related U.S. Application Data

(63) Continuation-in-part of application No. 17/146,593, filed on Jan. 12, 2021.

(60) Provisional application No. 62/995,127, filed on Jan. 14, 2020.

(51) Int. Cl.
| | | |
|---|---|---|
| *B29C 41/22* | (2006.01) | |
| *B29C 41/50* | (2006.01) | |
| *B29C 41/14* | (2006.01) | |
| *B32B 1/00* | (2006.01) | |
| *B32B 25/04* | (2006.01) | |
| *A41D 19/04* | (2006.01) | |
| *A41D 19/00* | (2006.01) | |
| *B29K 7/00* | (2006.01) | |
| *B29L 31/48* | (2006.01) | |

(52) U.S. Cl.
CPC .......... *B29C 41/50* (2013.01); *A41D 19/0058* (2013.01); *A41D 19/04* (2013.01); *B29C 41/14* (2013.01); *B29C 41/22* (2013.01); *B32B 1/00* (2013.01); *B32B 25/042* (2013.01); *B29K 2007/00* (2013.01); *B29L 2031/4864* (2013.01); *B32B 2250/02* (2013.01); *B32B 2250/248* (2013.01); *B32B 2437/02* (2013.01)

(58) Field of Classification Search
None
See application file for complete search history.

(56) References Cited

U.S. PATENT DOCUMENTS 5,869,569 A * 2/1999 Arai .................... C09D 151/003
524/823

* cited by examiner

*Primary Examiner* — Edmund H Lee
(74) *Attorney, Agent, or Firm* — Epstein Drangel LLP; Robert L. Epstein

(57) ABSTRACT

A liquid latex emulsion is compressed to align the randomly arranged molecules to form rows of aligned molecules. A continuous flow of the liquid is created in the direction of the rows of aligned molecules. A first latex layer of rows of aligned latex molecules is created on a form by immersing the form into the continuous flow of compressed liquid at a first immersion angle. A second latex layer is created on the first latex layer, the second latex layer has rows of aligned latex molecules extending in a direction different the rows of aligned latex molecules of the first layer. The second latex layer is formed by immersing the form with the first latex layer into the flow of compressed liquid at an immersion angle different from the first immersion angle.

1 Claim, 3 Drawing Sheets

METHOD OF FABRICATING LATEX PRODUCTS

CROSS-REFERENCE TO RELATED APPLICATIONS

Priority is claimed on U.S. Utility patent application Ser. No. 17/146,593, filed Jan. 12, 2021, the contents of which are incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a method of fabricating products made of latex and more particularly, to an improved method of fabrication of latex products which have excellent tactile sensitivity and increased strength, and thus are less like to tear during use.

2. Description of Prior Art Including Information Disclosed Under 37 CFR 1.97 and 1.98

Latex has many applications in various fields. Particularly in medicine, latex products in the form of gloves, sheets and the like are commonly used as a barrier protection. Such protective products save lives by preventing transmission of bacteria and viruses between patients and from patients to others. Further, they can reduce the possibility of contamination of the environment which can spread disease thru contact.

Latex is a highly desirable material because it allows the user excellent tactile sensitivity. That ability to "feel" is particularly important in gloves for medical use.

In addition, latex is low in cost. It is therefore ideal for products designed to be disposable or for single use applications.

BRIEF SUMMARY OF THE INVENTION

In the present invention, latex of a given thickness is made stronger and less likely to tear by organizing the latex molecules biaxially (or multi-axially) during the fabrication of the product.

In the extrusion industry it has become commonplace to make products in a biaxial fashion for increase in strength. This can be done in by various processes but fundamentally involves the tendency of molecules to organize themselves in a preferential direction when exiting an extrusion machine or die head.

Currently, latex products are produced by applying liquid latex to a form in the shape of the product as an emulsified solution with the molecules randomized so that there is no predictable way of orienting the molecules. The present invention employs the concept of molecule organization in the fabrication of latex products to obtain superior latex products.

The invention relates to a method of fabricating a latex product from a liquid latex emulsion comprising randomly arranged latex molecules on a form having the shape of the product to be fabricated. The method includes the steps of: (a) compressing the liquid latex emulsion to align the randomly arranged molecules to form rows of aligned molecules; (b) creating a continuous flow of the compressed liquid in the direction of the rows of aligned molecules; (c) forming a first latex layer comprising rows of aligned latex molecules on the exterior surface of the form by immersing the form into the continuous flow of compressed liquid at a first immersion angle; and (d) forming a second latex layer on the first latex layer, the second latex layer comprising rows of aligned latex molecules extending in a direction different from the direction of the rows of aligned latex molecules of the first layer, the second latex layer being formed by immersing the form with the first latex layer into the flow of compressed liquid at a second immersion angle different from that of the first immersion angle.

The step of compressing the liquid latex emulsion to align the randomly arranged molecules comprises the step of forcing the liquid latex emulsion thru a conduit with a reduced volume section to cause the randomly arranged molecules to in the liquid latex emulsion to align in rows.

The step of compressing the liquid latex emulsion to align the randomly arranged molecules comprises the step of forcing the liquid latex emulsion thru a funnel.

The step of compressing the liquid latex emulsion to align the randomly arranged molecules comprises the step of pressurizing the liquid latex emulsion before forcing the liquid latex emulsion thru the conduit with a restricted volume section.

The continuous flow of compressed liquid is created in a trough. The trough has an inlet and an outlet. The compressed liquid flows through the trough continuously from the inlet to the outlet.

The first immersion and the second immersion may take place in a single trough or in different troughs.

The method may be used to fabricate a latex product, such as a glove.

In accordance with another aspect of the present invention relates to a latex product including first, and second latex layers formed of rows of aligned latex molecules extending in different directions. Preferably, the first and second latex layers of rows of aligned latex molecules extend in different directions and are formed by separate immersions.

In accordance with another embodiment of the present invention, a method is provided of fabricating a latex product on a form having the shape of the product to be fabricated from a liquid latex emulsion comprising randomly arranged latex molecules, the method comprising the steps of: (a) compressing the liquid latex emulsion to align the randomly arranged molecules to form rows of aligned molecules; (b) creating a continuous flow of the compressed liquid in the direction of the rows of aligned molecules; (c) forming a first latex layer comprising rows of aligned latex molecules on the exterior surface of the form by transporting the compressed liquid through one or more tubes ending proximate the surface of the form and moving the ends of the one or more tubes and the form relative to each other in a first direction; and (d) forming a second latex layer on the first latex layer, the second latex layer comprising rows of aligned latex molecules extending in a direction different from the direction of the rows of aligned latex molecules of the first layer, the second latex layer being formed by moving the ends of the one or more tubes and the form relative to each other in a second direction.

In accordance with another embodiment of the present invention, a method is provided of fabricating a product on a form having the shape of the product to be fabricated from a liquid emulsion comprising randomly arranged latex molecules, the method comprising the steps of: (a) compressing the liquid emulsion to align the randomly arranged molecules to form rows of aligned molecules; (b) creating a continuous flow of the compressed liquid in the direction of the rows of aligned molecules; (c) forming a first layer comprising rows of aligned molecules on the exterior surface of the form by immersing the form into the continuous flow of compressed liquid at a first immersion angle; and (d) forming a second layer on the first layer, the second latex layer comprising rows of aligned latex molecules extending in a direction different from the direction of the rows of aligned molecules of the first layer, the second layer being formed by immersing the form with the first layer into the flow of compressed liquid at an immersion angle different from that of the first immersion angle.

BRIEF DESCRIPTION OF THE SEVERAL VIEWS OF DRAWINGS

To these and to such other objects that may hereinafter appear, the present invention relates to a method of fabricating latex products as described in detail in the following specification and recited in the annexed claims, taken together with the accompanying drawings in which FIG. 1 is a simplified depiction of the apparatus which can be used to fabricate latex products using the method of the present invention showing a first immersion step;

DETAILED DESCRIPTION OF THE INVENTION

Figure 1:
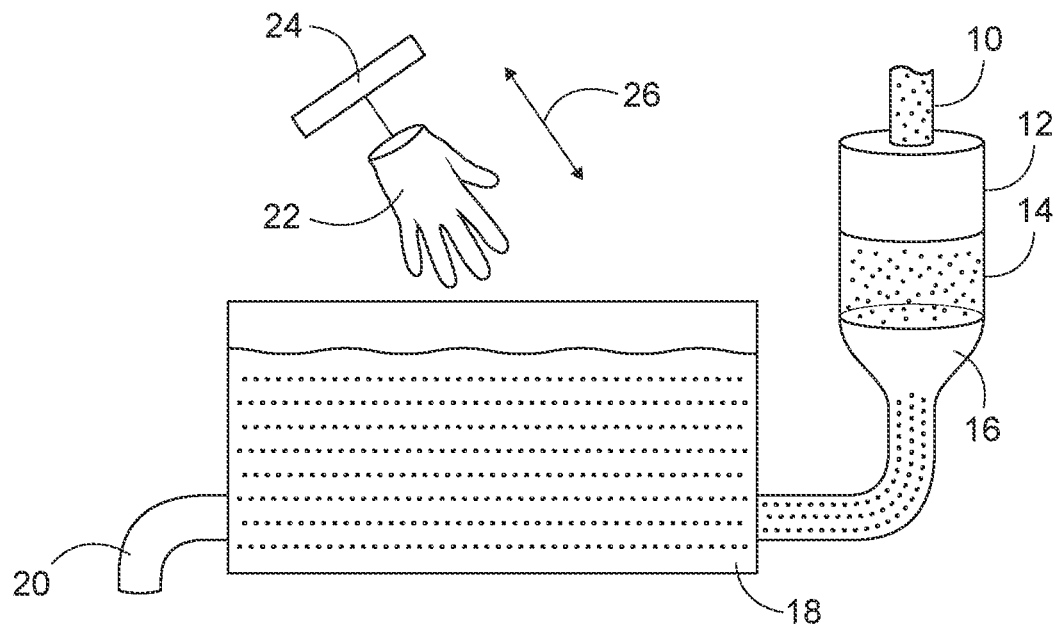

Throughout the specification, the term "latex" is used to include latex and nitrile, the latter being latex and a side group. Nitrile is more popular and stronger but tends to tear. Further, while the method is described in the context of a liquid emulsion, it may be suitable for use with a colloid liquid, as well.

The latex fabrication method utilizes a system in which products are fabricated in a liquid latex emulsion consisting of organized latex molecules which are kept in linear motion as they flow through a trough. The randomly arranged latex molecules of the emulsion are organized prior to entering the trough by compression of the liquid latex.

An object, such as a form in the shape of the product to be fabricated, is immersed into the trough containing the liquid emulsion of aligned latex molecules by moving the form at an angle relative to the direction of the liquid flow through trough (the immersion angle). In the trough, the aligned latex molecules are deposited in a layer on the exterior surface of the form in multiple rows extending in a direction parallel to the linear liquid flow.

The form with the first latex layer is then immersed a second time in a liquid latex emulsion of aligned latex molecules to create a second layer of latex over the first latex layer. The latex emulsion of the second immersion is kept in continuous linear motion as the liquid moves through the trough, as in the first immersion.

The second immersion takes place at a different immersion angle relative to the direction of liquid flow. As a result, the rows of aligned molecules of the second layer extend in a different direction than the rows of aligned molecules of the first layer.

The second immersion may take place in the same or a different trough as the first immersion. The change of immersion angle can be accomplished either by reorienting the form relative to the trough or motion in various axis of a lifting mechanism.

The result of this fabrication method is that the product is formed of at least two fused layers of latex, each layer consisting of rows of aligned molecules extending in a different direction. Formed in this way, a product of determined thickness will have increased strength without deleterious loss of tactile sensitivity and other properties.

In certain products, such as gloves, the geometries are such that it may be necessary to employ more than two layers with aligned molecules extending in different directions to achieve the desired result. This may be done by adding troughs or by changing the immersion angles for each layer.

An important aspect of the present invention is to control the relative axiality of the molecules as the latex layers are formed. This can be done mechanically as illustrated in the drawings by the application of physical force to the liquid latex emulsion or electrically (by use of external electric charge or an electric charge imposed upon or within the molecules). Further, this fabrication method may be used in other types of emulsions as well where a desired orientation of randomly oriented molecules may be required.

FIG. 1 illustrates the first immersion step of the method of the present invention. The liquid latex emulsion with randomly arranged latex molecules is supplied by conduit 10 to a compressor 12 which compresses the liquid. The compressed liquid flows into a funnel shaped pipe 16 which has a reduced volume section at a pressure of at least two psi which is appropriate to viscosity, temperature and other variables of the material in order to achieve laminar flow and linear molecule orientation.

As the liquid passes through funnel 16, the narrowing diameter of the reduced volume section of the pipe compresses the randomly arranged molecules into rows of aligned molecules. The liquid with the aligned molecules enters trough 18 and continuously flows through the trough and out of drain 20.

A form 22 in the shape of the product to be fabricated, shown in the drawings as a glove for purposes of illustration, is attached to the end of a base 24. Form 22 is moved from above the trough into the liquid flow in the direction indicated by arrow 26 (the first immersion angle) to create a first latex layer 28 on the exterior surface of the form.

Figure 2:
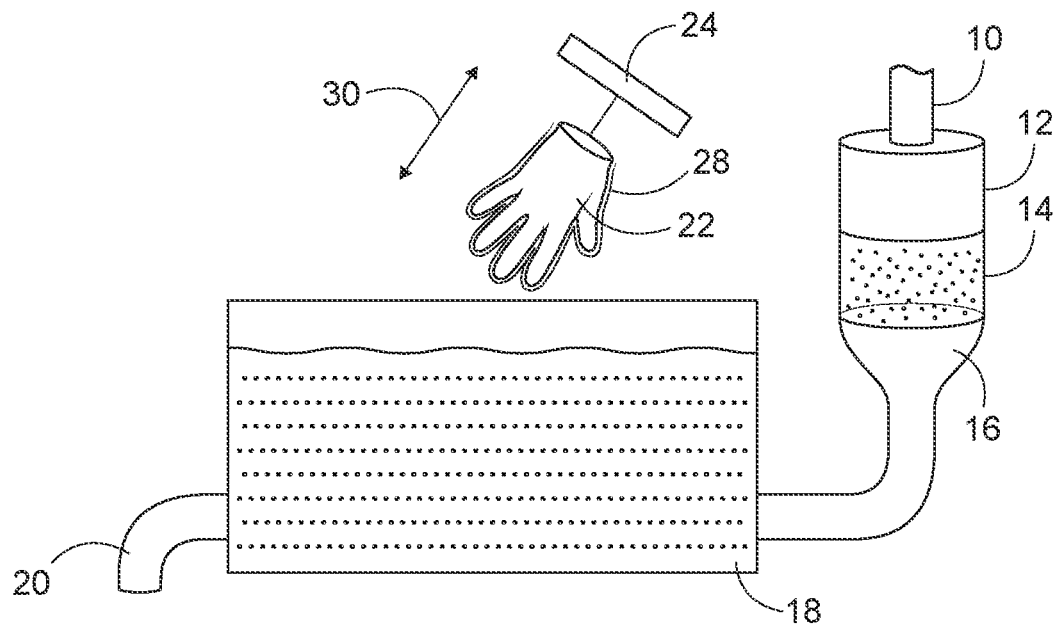
FIG. 2 is a simplified depiction of the apparatus which can be used to fabricate latex products using the method of the present invention showing a second immersion step.

Now referring to FIG. 2, form 22 with the first latex layer 28 is moved from above trough 18 into the liquid flow in the direction of arrow 30 (the second immersion angle) such that the form is immersed a second time to create a second latex layer 32 over first layer 28. However, because the direction of second immersion is different than the direction of the first immersion, the molecules in the second layer 32 will be aligned in a different direction than in the first layer 28.

Figure 3:
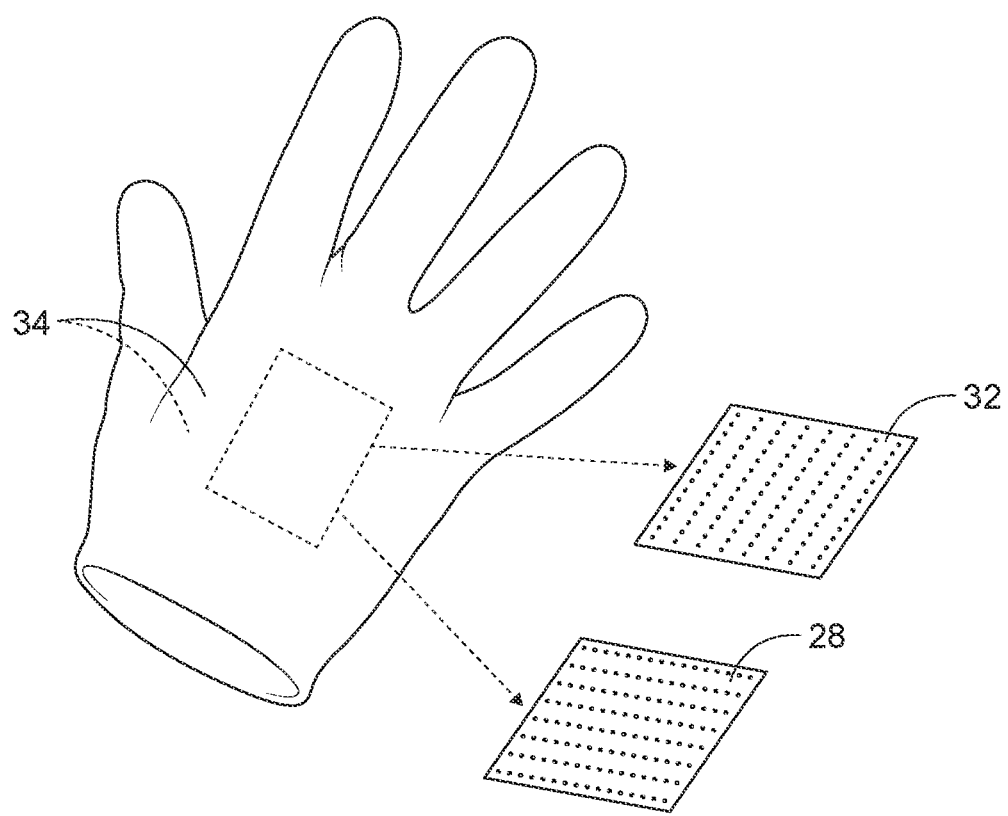
FIG. 3 is an image of a latex glove fabricated by the method of the present invention showing the two-layer construction where the molecules in each layer are aligned in different directions.

FIG. 3 shows the finish product, glove 34. The glove is formed of two fused latex layers, 28, 32 in which the latex molecules are aligned in different directions.

Figure 4:
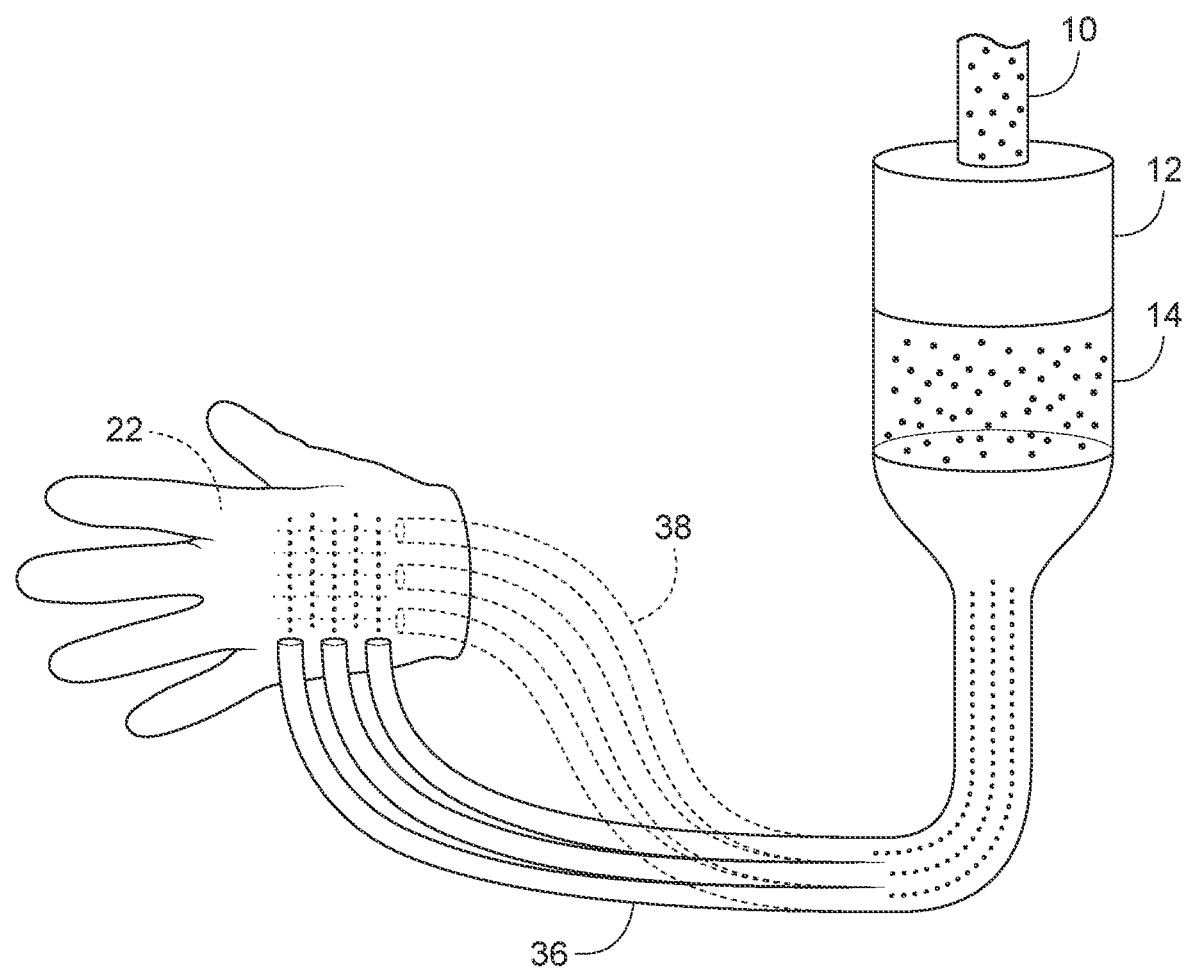
FIG. 4 is a simplified depiction of apparatus which can be used to perform another preferred embodiment to the method of the present invention.

The apparatus for producing a product in accordance with a second preferred embodiment of the invention is illustrated in FIG. 4. As in the previous embodiment, the liquid latex emulsion with randomly arranged latex molecules is supplied by conduit 10 to a compressor 12 which compresses the liquid. The compressed liquid flows into a funnel shaped pipe 16 which has a reduced volume section in order to achieve laminar flow and linear molecule orientation.

As the liquid passes through funnel 16, the narrowing diameter of the reduced volume section of the pipe compresses the randomly arranged molecules into rows of aligned molecules. However, in this embodiment, instead of the trough, the liquid with the aligned molecules is transported to the surface of form 22 through one or an array of flexible tubes 36 the ends of which are situated proximate to the surface of the form.

In order to create the latex layers on the form, the form and the ends of the tube are moved relative to each other first in one direction to create the first layer, and then in a second, different direction, illustrated by the position of the tubes 38, to create the second layer over the first layer. The tubes maintain the directional orientation of molecules as the hit and attach to form, making the laminar flow more reliable.

With this embodiment, a portion of the product may be formed of one or more layers of latex molecules deposited randomly and other portions of the product formed of layers of aligned molecules. For example, the fingers of the glove might be formed of latex of molecules randomly oriented whereas the cuff and palm portions may be formed of biaxial layers of linearly arranged molecules.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

The invention claimed is:

1. A method of fabricating a latex product on a form having the shape of the product to be fabricated from a liquid latex emulsion comprising randomly arranged latex molecules, the method comprising the steps of:
   (a) compressing the liquid latex emulsion to align the randomly arranged molecules to form rows of aligned molecules;
   (b) creating a continuous flow of the compressed liquid in the direction of the rows of aligned molecules;
   (c) forming a first latex layer comprising rows of aligned latex molecules on the exterior surface of the form by transporting the continuous flow of the compressed liquid through one or more tubes ending proximate the surface of the form and moving the ends of the one or more tubes and the form relative to each other in a first direction; and
   (d) forming a second latex layer on the first latex layer, the second latex layer comprising rows of aligned latex molecules extending in a direction different from the direction of the rows of aligned latex molecules of the first layer, the second latex layer being formed by transporting the continuous flow of the compressed liquid through the one or more tubes ending proximate the surface of the form and moving the ends of the one or more tubes and the form relative to each other in a second direction.

* * * * *